(12) United States Patent
Matsumoto

(10) Patent No.: US 12,109,604 B2
(45) Date of Patent: Oct. 8, 2024

(54) METHOD OF MANUFACTURING JOINED MEMBER

(71) Applicant: MATSUMOTO INDUSTRY CO., LTD., Fukuoka (JP)

(72) Inventor: Shinsuke Matsumoto, Fukuoka (JP)

(73) Assignee: MATSUMOTO INDUSTRY CO., LTD., Fukuoka (JP)

(*) Notice: Subject to any disclaimer, the term of this patent is extended or adjusted under 35 U.S.C. 154(b) by 536 days.

(21) Appl. No.: 17/615,906

(22) PCT Filed: Feb. 22, 2021

(86) PCT No.: PCT/JP2021/006647
§ 371 (c)(1),
(2) Date: Dec. 2, 2021

(87) PCT Pub. No.: WO2021/256004
PCT Pub. Date: Dec. 23, 2021

(65) Prior Publication Data
US 2022/0314297 A1    Oct. 6, 2022

(30) Foreign Application Priority Data
Jun. 16, 2020    (JP) .................................. 2020-103991

(51) Int. Cl.
*B21D 39/03*    (2006.01)
*F16B 4/00*    (2006.01)
*F16B 17/00*    (2006.01)

(52) U.S. Cl.
CPC ............ *B21D 39/031* (2013.01); *F16B 4/004* (2013.01); *F16B 17/004* (2013.01)

(58) Field of Classification Search
CPC ..... B21D 39/031; B21D 39/032; F16B 4/004; F16B 17/004; F16B 3/00; F16B 17/00; F16B 5/07
See application file for complete search history.

(56) References Cited

FOREIGN PATENT DOCUMENTS

| JP | S46-11370 B1 | 3/1971 |
|---|---|---|
| JP | S61-80733 A | 4/1986 |
| JP | H1-295013 A | 11/1989 |
| JP | H4-322894 A | 11/1992 |
| JP | 2002-372011 A | 12/2002 |

OTHER PUBLICATIONS

ISR for PCT/JP2021/006647, dated Apr. 13, 2021.

*Primary Examiner* — Lee A Holly
(74) *Attorney, Agent, or Firm* — Greenblum & Bernstein, P.L.C.

(57) ABSTRACT

A method of manufacturing a joined member where joining portions of at least two members are integrally formed with each other by press working thus joining said at least two members, the method comprises an engaging step, an inserting step, and a press working step.

10 Claims, 10 Drawing Sheets

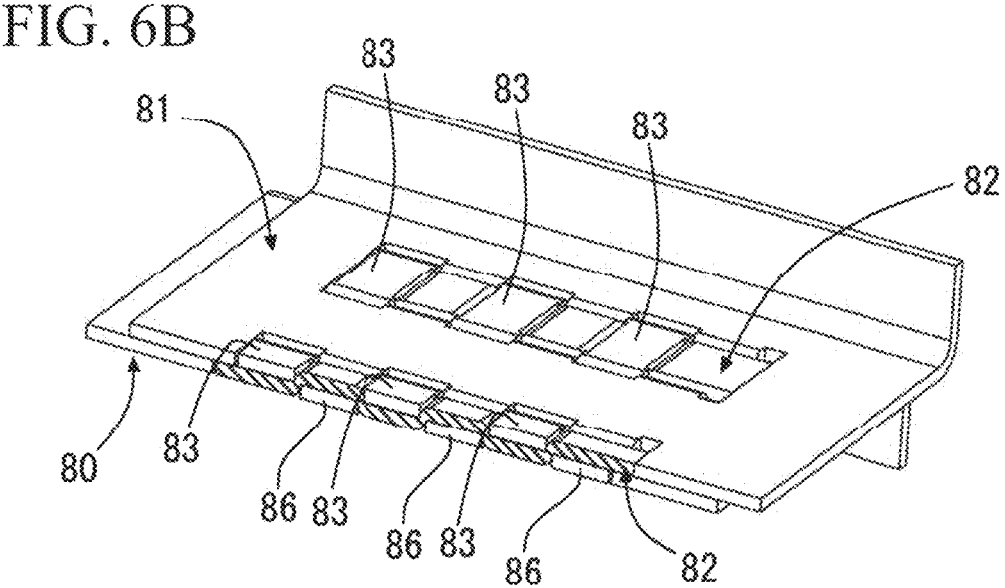

(a)

(b)

METHOD OF MANUFACTURING JOINED MEMBER

TECHNICAL FIELD

The present invention relates to a method of manufacturing a joined member by integrally joining work members by press working.

BACKGROUND ART

Conventionally, as a method of joining members made of metal or the like, there have been used methods such as welding, fastening by bolts, crimping, press-fitting, and bonding. Among such methods, welding is a method of joining with a large strength, and is used for members in various applications such as a sheet frame of a vehicle (see Patent Literature 1).

However, welding is a technique that requires expertise and hence, quality of a product is liable to be influenced by a skill of a worker thus giving rise to a drawback that the detection of a joining strength (the detection of a defective product) is difficult. Accordingly, there has been a demand for a new joining method that can replace welding and can solve these drawbacks.

PRIOR ART DOCUMENTS

Patent References

Patent Literature 1: Japanese Laid-Open Patent Publication No.04-322894

SUMMARY OF INVENTION

Technical Problem

The present invention has been made in view of the above-mentioned circumstances, and it is an object of the present invention to provide a novel method that can join members with a stable and high strength.

Solution to Problem

An inventor of the present invention has extensively studied a joining method that can replace welding. As a result, the inventor has found that members can be joined with a stable and high strength by making joining portions of a first work member and a second work member engage with each other in a specified mode, by connecting the joining portions of these two members by a connecting member in such an engaging state, and by pressing the joining portions in such a connecting state, and has completed the present invention based on such finding.

That is, the first present invention is as follows.

[1] A method of manufacturing a joined member where joining portions of at least two members are integrally formed with each other by press working thus joining said at least two members, the method comprising:

an engaging step where a first work member having a first bridge portion protruding in a bridge shape and a second work member having a second opening corresponding to the first bridge portion of the first work member are made to engage with each other by inserting the first bridge portion of the first work member into the second opening of the second work member;

an inserting step where a connecting member is inserted into the insertion hole formed in the first bridge portion in a state where the first bridge portion of the first work member is inserted into and is made to engage with the second opening of the second work member; and a press working step where the first bridge portion of the first work member, the second opening of the second work member and the connecting member are integrally formed with each other by pressing in a state where the connecting member is inserted into an insertion hole formed in the first bridge portion of the first work member.

[2] The method of manufacturing a joined member according to 1, wherein the first work member has a plurality of first bridge portions arranged in a straight line shape, and the second work member has a plurality of the second openings arranged in a straight line shape corresponding to the first bridge portions of the first work member.

[3] The method of manufacturing a joined member according to 1, wherein the first work member has a plurality of the first bridge portions arranged in an annular shape, and the second work member has a plurality of second openings arranged in an annular shape corresponding to the first bridge portions of the first work member.

Also, the second present invention is as follows.

[4] A method of manufacturing a joined member where joining portions of at least two members are integrally formed with each other by press working thus joining said at least two members, the method comprising:

an engaging step where a first work member having a first bridge portion protruding in a bridge shape and a first opening disposed close to the first bridge portion, and a second work member having a second opening corresponding to the first bridge portion of the first work member and a second bridge portion disposed close to the second opening and corresponding to the first opening of the first work member are made to engage with each other by bringing the first bridge portion of the first work member and the second bridge portion of the second work member close to each other;

an inserting step where a connecting member is inserted into a communication passage formed of continuous insertion holes formed in the first bridge portion and the second bridge portion in a state where the first bridge portion of the first work member and the second bridge portion of the second work member are made to engage with each other by being disposed close to each other; and a press working step where the first bridge portion and the first opening of the first work member, the second opening and the second bridge portion of the second work member, and the connecting member are integrally formed with each other by pressing.

[5] The method of manufacturing a joined member according to 4, wherein the first work member has a plurality of the first bridge portions and a plurality of the first opening, the first bridge portions and the first openings are alternately arranged in a straight line shape, the second work member has a plurality of second openings and a plurality of second bridges, and the second openings and the second bridges are alternately arranged in a straight line shape corresponding to the first bridge portions and the first openings of the first work member.

[6] The method of manufacturing a joined member according to claim 4, wherein the first work member has a plurality of the first bridge portions and a plurality of the first openings, the first bridge portions and the first openings are alternately arranged in an annular shape, the second work member has a plurality of second openings and a plurality of second bridges, the second openings and the second bridges are alternately arranged in an annular shape corresponding to the first bridge portions and the first openings of the first work member.

[7] The method of manufacturing a joined member according to any one of 1 to 6, wherein the joining portion of the first work member is formed in a flat plate shape or a curved plate shape.

[8] The method of manufacturing a joined member according to any one of 1 to 7, wherein the joining portion of the second work member is formed in a flat plate shape or a curved plate shape.

Advantageous Effects of Invention

According to the method of manufacturing a joined member according to the present invention, it is possible to manufacture members joined with a high strength in a stable manner.

BRIEF DESCRIPTION OF DRAWINGS

FIG. 6B is an explanatory view of members used in the method of manufacturing a joined member according to the third embodiment of the second present invention, and is a schematic view of a state where a joining surface of the joined member after press working is shown in cross section.

DESCRIPTION OF EMBODIMENTS

Figure 1A:
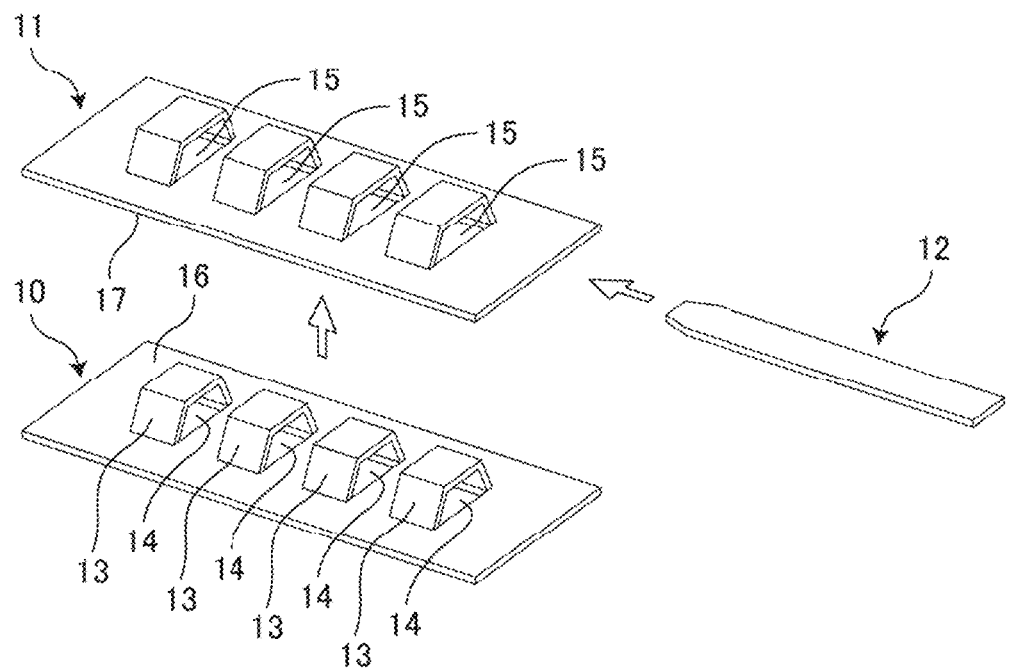
FIG. 1A is an explanatory view of members used in a method of manufacturing a joined member according to a first embodiment of a first present invention, and is a schematic view of the respective members.

A method of manufacturing a joined member according to a first present invention is where joining portions of at least two members are integrally formed with each other by press working thus joining said at least two members, the method comprising: an engaging step where a first work member having a first bridge portion protruding in a bridge shape and a second work member having a second opening corresponding to the first bridge portion of the first work member are made to engage with each other by inserting the first bridge portion of the first work member into the second opening of the second work member; an inserting step where a connecting member is inserted into the insertion hole formed in the first bridge portion in a state where the first bridge portion of the first work member is inserted into and is made to engage with the second opening of the second work member; and a press working step where the first bridge portion of the first work member, the second opening of the second work member and the connecting member are integrally formed with each other by pressing in a state where the connecting member is inserted into an insertion hole formed in the first bridge portion of the first work member.

According to the method of manufacturing a joined member of the first present invention, the joined member with a high strength can be manufactured in a stable manner. That is, unlike a conventional welding method that requires a skilled technique, press working can be performed in the method of the present invention and hence, quality of a product is not influenced by a skill of a worker whereby joining of members can be performed in a stable manner. Further, working efficiency can be enhanced by press working. Still further, the manufacturing method of the first present invention does not require high heat treatment and hence, the manufacturing method can be used in joining of members having low heat resistance that are not suitable for welding. Further, as the work member on one side (the second work member), the member having the extremely simple configuration that an opening is merely formed in the joining portion can be used.

Engaging Step

The engaging step is a step where the first work member having the first bridge portion that protrudes in a bridge shape and the second work member having the second opening that corresponds to the first bridge portion of the first work member are made to engage with each other by inserting the first bridge portion of the first work member into the second opening of the second work member. In this step, by inserting the first bridge portion of the first work member from one side of the second opening, a state is brought about where the insertion hole in the first bridge portion appears on the other side of the second opening. Three or more members can be joined to each other by using a plurality of second work members.

(First Work Member)

As the first work member, for example, a member where a joining portion has a flat plate shape or a curved plate shape can be named. However, the shapes of portions of the first work member other than the joining portion are not particularly limited. As the member where the joining portion has a curved plate shape, a halved tubular member and a tubular member can be exemplified.

The first work member has the first bridge portion. The first bridge portion is a portion protruding in an arch shape that is formed in a portion (joining portion) of the member. A through hole (insertion hole) is formed in the first bridge portion.

A method of preparing the first bridge portion is not particularly limited. A method that makes use of the plastic deformation of metal can be named Specifically, for example, a method can be named where two cuts are formed in the joining portion of the first work member, and a portion between the cuts is pushed upward (raised) from below.

A material of the first work member is not particularly limited provided that the bridge portion can be formed and press working can be performed. For example, as the material of the first work member, metal and a synthetic resin can be named. Metal is preferable. As metal, specifically, for example, steel such as ordinary strength steel (carbon steel), special steel such as alloy steel, special use steel or tool steel, and non-ferrous metal such as an aluminum alloy, a copper alloy, titanium, magnesium and the like can be named. From a viewpoint that the bridge portion can be easily formed and press working can be easily performed, ordinary strength steel (carbon steel), stainless steel, and a high tensile strength steel plate are preferable. From a viewpoint of an inexpensive material, ordinary strength steel (carbon steel) is more preferable.

With respect to the first bridge portion of the first work member, one or a plurality of first bridge portions can be formed. Usually, the number of first bridge portions corresponds to the number of second openings of the second work member described later, and the first bridge portions are disposed at positions corresponding to the second openings.

(Second Work Member)

As the second work member, in the same manner as the first work member, for example, a member where the joining portion has a flat plate shape or a curved plate shape can be named. However, the shapes of portions of the second work member other than the joining portion are not particularly limited. As the member where the joining portion has a curved plate shape, a halved tubular member and a tubular member can be exemplified.

The second work member has the second opening that corresponds to the first bridge portion of the first work member. It is sufficient that the second opening is an opening (hole) that allows the insertion of the first bridge portion of the first work member. For example, besides an opening formed by cutting out a portion of the second work member, an opening formed by protruding a portion of the second work member in an arch shape can be named It is sufficient that the shape of the second opening is a shape that allows the insertion of the first bridge portion. However, the shape that corresponds to the first bridge is preferable. That is, in a case where the first bridge portion has a rectangular shape as viewed in a plan view, it is preferable that the opening also have a rectangular shape of a size that corresponds to the first bridge portion. Further, in a case where the second opening is formed by protruding a portion of the second work member in an arch shape, it is preferable that such an arch shape be a shape substantially equal to an arch shape of the first bridge portion. When the first work member is inserted, a state is brought about where the insertion hole in the first bridge portion appears on a side opposite to an insertion side of the second opening.

With respect to the second opening of the second work member, one or a plurality of second openings can be formed. Usually, the number of second openings corresponds to the number of first bridge portions of the first work member, and the second openings are disposed at positions corresponding to the first bridge portions.

A material of the second work member is not particularly limited provided that the opening can be formed and press working can be performed. For example, as the material of the second work member, metal and a synthetic resin can be named. Metal is preferable. As metal, specifically, for example, steel such as ordinary strength steel (carbon steel), special steel such as alloy steel, steel for special use or tool steel, non-ferrous metal such as an aluminum alloy, a copper alloy, titanium, magnesium and the like can be named. From a viewpoint that the bridge portion can be easily formed and press working can be easily performed, ordinary strength steel (carbon steel), stainless steel, and a high tensile strength steel plate are preferable. From a viewpoint of an inexpensive material, ordinary strength steel (carbon steel) is more preferable. Further, the second work member may be formed of the same material as the first work member or may be formed of a material different from a material of the first work member. In a case where the opening is formed by cutting out a portion of the second work member, as the second work member, a member made of a material that does not allow the formation of the bridge portion can also be used.

(Preferred Specific Modes of First Work Member and Second Work Member)

In a case where the first work member has a plurality of first bridge portions and a second work member has the plurality of second openings corresponding to the first bridge portions of the first work member, it is preferable that the first bridge portions be arranged in a straight line shape or in an annular shape, and the second openings are arranged in a straight line shape or an in an annular shape. That is, it is preferable that the first work member have the plurality of first bridge portions arranged in a straight line shape, and the second work member have the plurality of second openings arranged in a straight line shape corresponding to the first bridge portions of the first work member. Further, it is preferable that the first work member have the plurality of first bridge portions arranged in an annular shape, and the second work member have the plurality of second openings arranged in an annular shape corresponding to the first bridge portions of the first work member. In a case where the members where the first bridge portions and the second openings are arranged in an annular shape are used, strengths of the members in a shearing direction are made uniform.

In the case where the first work member has the plurality of first bridge portions and the second work member has the plurality of second openings corresponding to the first bridge portions of the first work member, the joining portion may be formed of a plurality of rows in a straight line shape or in an annular shape formed of the plurality of first bridge portions and the plurality of second openings.

Inserting Step

The inserting step is a step where the connecting member is inserted into the insertion hole in the first bridge portion in a state where the first bridge portion of the first work member is inserted into and is made to engage with the second opening of the second work member. In this step, by inserting the connecting member into the insertion holes in the first bridge portions, the first work member and the second work member can be temporarily fixed to each other, and when press working is performed, firm joining can be performed in cooperation with the first bridge portion and the second opening.

(Connecting Member)

The shape of the connecting member is not limited provided that the insertion of the connecting member into the insertion hole in the first bridge portion is allowed. For example, as the connecting member, a round rod and a rod having a flat plate shape can be named. As a material of the connecting member, a material substantially equal to the material of the first work member or the second work member can be used. The material of the connecting member may be the same material as the first work member and/or the second work member, or may be different from the material of the first work member and/or the second work member. In a mode where the material of the connecting member differs from the materials of the first work member and the second work member, for example, a mode can be named where a high tensile strength steel plate is used as a material of the connecting member in a case where the first work member and/or the second work member is formed of a thin ordinary strength steel plate. By using the material having a high strength steel plate that differs from the material of the first work member and the second work member as the material of the connecting member, a joining strength of the joined portion can be enhanced. Although a cross-sectional shape of the connecting member is not particularly limited, the shape that allows the insertion of the connecting member into a communication passage described later without forming a gap is preferable. With such a configuration, when pressing is performed, the joined portion can be firmly crimped.

Press Working Step

The press working step is a step where, in a state where the connecting member is inserted into the insertion hole the first bridge portion of the first work member, the first bridge portion of the first work member, the second opening of the second work member and the connecting member are integrally formed by pressing. By performing such pressing, the first bridge portion of the first work member, the second opening of the second work member and the connecting member are collapsed (crimped) and hence, these members can be firmly brought into close contact with each other (joined to each other) whereby these members can be fixed to each other. As a pressing method, an ordinary pressing method can be used. For example, although hot forging or cold forging may be used, it is preferable to use cold forging from a viewpoint of size accuracy.

Next, a method of manufacturing a joined member according to the second present invention is described.

A method of manufacturing a joined member according to a second present invention is where joining portions of at least two members are integrally formed with each other by press working thus joining said at least two members, the method comprising: an engaging step where a first work member having a first bridge portion protruding in a bridge shape and a first opening disposed close to the first bridge portion, and a second work member having a second opening corresponding to the first bridge portion of the first work member and a second bridge portion disposed close to the second opening and corresponding to the first opening of the first work member are made to engage with each other by bringing the first bridge portion of the first work member and the second bridge portion of the second work member close to each other; an inserting step where a connecting member is inserted into a communication passage formed of continuous insertion holes formed in the first bridge portion and the second bridge portion in a state where the first bridge portion of the first work member and the second bridge portion of the second work member are made to engage with each other by being disposed close to each other; and a press working step where the first bridge portion and the first opening of the first work member, the second opening and the second bridge portion of the second work member, and the connecting member are integrally formed with each other by pressing.

According to the method of manufacturing a joined member of the second present invention, the joined member with a high strength can be manufactured in a stable manner. That is, unlike a conventional welding method that requires a skilled technique, press working can be performed in the method of the present invention and hence, quality of a product is not influenced by a skill of a worker whereby joining of members can be performed in a stable manner. Further, working efficiency can be enhanced by press working. Still further, the manufacturing method of the first present invention does not require high heat treatment and hence, the manufacturing method can be used in joining of members having low heat resistance that are not suitable for welding. Further, the work members respectively have the bridges and hence, in the second present invention, the members can be more firmly crimped than the abovementioned first present invention. Accordingly, joining can be performed with a higher strength in the second present invention.

Engaging Step

The engaging step is a step where the first work member having the first bridge portion and the first opening and the second work member having the second opening and the second bridge portion are made to engage with each other by bringing the first bridge portion of the first work member and the second bridge portion of the second work member close to each other. In this step, by making the first bridge portion of the first work member and the second bridge portion of the second work member engage with each other by bringing the first bridge portion of the first work member and the second bridge portion of the second work member close to each other, a communication passage is formed of continuous insertion holes formed in the first bridge portion and the second bridge portion.
(First Work Member)

As the first work member, for example, a member where a joining portion has a flat plate shape or a curved plate shape can be named. However, the shapes of portions of the first work member other than the joining portion are not particularly limited. As the member where the joining portion has a curved plate shape, a halved tubular member and a tubular member can be exemplified.

The first work member has: the first bridge portion protruding in a bridge shape; and the first opening disposed close to the first bridge portion.

The first bridge portion is a portion formed in a portion (joining portion) of the member and protruding in an arch shape. A through hole (insertion hole) is formed in the first bridge portion.

A method of preparing the first bridge portion is not particularly limited. A method that makes use of the plastic deformation of metal can be named Specifically, for example, a method can be named where two cuts are formed in the joining portion of the first work member, and a portion between the cuts is pushed upward (raised) from below.

A material of the first work member is not particularly limited provided that the bridge portion can be formed and press working can be performed. For example, as the material of the first work member, metal and a synthetic resin can be named. Metal is preferable. As metal, specifically, for example, steel such as ordinary strength steel (carbon steel), special steel such as alloy steel, special use steel or tool steel, and non-ferrous metal such as an aluminum alloy, a copper alloy, titanium, magnesium and the like can be named. From a viewpoint that the bridge portion can be easily formed and press working can be easily performed, ordinary strength steel (carbon steel), stainless steel, and a high tensile strength steel plate are preferable. From a viewpoint of an inexpensive material, ordinary strength steel (carbon steel) is more preferable.

With respect to the first bridge portion of the first work member, one or a plurality of first bridge portions can be formed. Usually, the number of first bridge portions corresponds to the number of second openings of the second work member described later, and the first bridge portions are disposed at positions corresponding to the second openings.

As the first opening disposed close to the first bridge portion, for example, besides an opening formed by cutting out a portion of the first work member, an opening formed by protruding a portion of the first work member in an arch shape can be named. The shape of the first opening is not particularly limited provided that the insertion of at least a portion of the second bridge portion of the corresponding second work member into the first opening is allowed in the press working step. However, in the same manner as the opening in the first present invention, it is preferable that the first opening have substantially the same shape as the bridge portion. With the existence of such a first opening, in performing the press working step described later, the second bridge proton of the second work member and the connecting member that are plastically deformed by a press are pushed out to an opposite side of the first opening and are expanded (crimped) and hence, the work members can be firmly brought into close contact with each other (joined to each other).

One first opening or a plurality of first openings may be formed. Usually, the number of first openings corresponds to the number of second bridge positions of the second work member, and the first openings are disposed at positions corresponding to the second bridge portions.
(Second Work Member)

The second work member has substantially the same configuration as the first work member other than the positional relationship between the bridge portion and the opening and hence, the description of the second work member is omitted.
(Preferred Specific Modes of First Work Member and Second Work Member)

In the case where the first work member has the plurality of first bridge portions and the plurality of first openings and the second work member has the plurality of second openings and the plurality of second bridge portions, it is preferable that the first bridge portions and the first openings be alternately arranged in a straight line shape or in an annular shape, and the second openings and the second bridge portions be alternately arranged in a straight line shape or an annular shape correspondingly. That is, it is preferable that the first work member have the plurality of first bridge portions and the plurality of first openings, the first bridge portions and the first openings be alternately arranged in a straight line shape, the second work member have the plurality of second openings and the plurality of second bridge portions, and the second openings and the second bridge portions be alternately arranged in a straight line shape corresponding to the first bridge portions and the first openings of the first work member. Further, it is preferable that the first work member have the plurality of first bridge portions and the plurality of first openings, the first bridge portions and the first openings be alternately arranged in an annular shape, the second work member have the plurality of second openings and the plurality of second bridges, and the second openings and the second bridges be alternately arranged in an annular shape corresponding to the first bridge portions and the first openings of the first work member. With the use of the members where the bridge portions and the openings are arranged in an annular shape, a strength in a shearing direction can be made uniform.

In the case where the first work member has the plurality of first bridge portions and the plurality of first openings, and the second work member has the plurality of second openings and the plurality of second bridge portions corresponding to the plurality of first bridge portions and the plurality of first openings of the first work member, the joined portion may be formed of a plurality of rows in a straight line shape or in an annular shape where such rows are formed of the plurality of first bridge portions and the plurality of first openings, and the plurality of second openings and the plurality of bridge portions.

Inserting Step

The inserting step is a step where, in a state where the first bridge portion of the first work member and the second bridge portion of the second work member are made to engage with each other by being disposed close to each other, the connecting member is inserted into the communication passage formed of the continuous insertion holes formed in the first bridge portion and the second bridge portion. In this step, by inserting the connecting member into the insertion holes formed in the first bridge portion and the second bridge portion, the first work member and the second work member are temporarily fixed to each other. And when press working is performed, the firm joining can be performed in cooperation with the first bridge portion, the second opening, the first opening, and the second bridge portion.

(Connecting Member)

The shape of the connecting member is not limited provided that the connecting member can be inserted into the communication passage formed by the continuous insertion holes formed in the first bridge portion and the second bridge portion. For example, as the connecting member, a round rod or a rod having a flat plate shape can be named. As the material of the connecting member, a material substantially equal to the materials of the first work member and the second work member can be used. The material of the connecting member may the same materials as the first work member and/or the second work member or may be different from the material of the first work member and/or the second work member. In a mode where the material of the connecting member differs from the materials of the first work member and/or the second work member, while the first work member and/or the second work member is/are formed of a thin plate made of ordinary strength steel, a high tensile strength steel plate is used as the material of the connecting member. By using the material having a high strength that differs from the material of the first work member and the second work member as the material of the connecting member, a joining strength can be enhanced. Although a cross-sectional shape of the connecting member is not particularly limited, it is preferable that the connecting member have a shape that allows the insertion of the connecting member into the communication passage described later without forming a gap. With such a configuration, when pressing is performed, firm joining can be performed in co joined portion can be firmly crimped.

Press Working Step

The press working step is a step where, in a state where the connecting member is inserted into the communication passage, the first bridge portion and the first opening of the first work member, the second opening and the second bridge portion of the second work member and the connecting member are integrally formed with each other by pressing. By performing the pressing, the first bridge portion and the first opening of the first work member, second opening and the second bridge portion of the second work member, and the connecting member are collapsed (crimped) and hence, these members are firmly brought into close contact with each other (joined to each other) whereby these members can be fixed to each other. As a pressing method, an ordinary pressing method can be used. For example, although hot forging or cold forging may be used, it is preferable to use cold forging from a viewpoint of size accuracy.

Although methods of manufacturing a joined member according to the first and second present inventions will be described in detail with reference to drawings hereinafter, the scope of the present invention is not limited to these embodiments. The drawings that are referenced in the embodiments are schematically described for deepening the understanding of the present invention and hence, there may be a case where ratios or the like of sizes of objects depicted in the drawings differ from ratios or the like of sizes of an actual object. For example, the description is adopted where the thicknesses of the bridge portion and the connecting member are expressed thinner than actual thicknesses and the height of the bridge portion is expressed higher than an actual height of the bridge portion so as to facilitate the understanding of an engagement state between the first work member and the second work member.

Figure 1B:
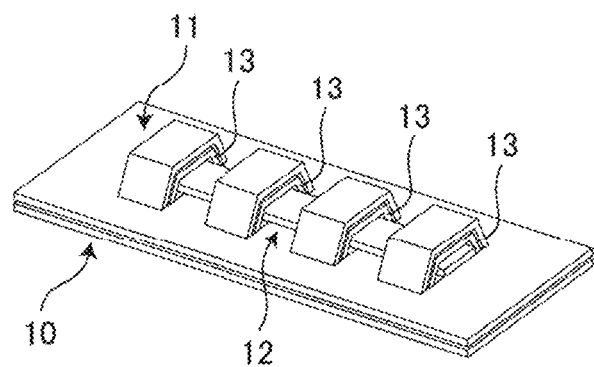
FIG. 1B is an explanatory view of the members used in the method of manufacturing a joined member according to the first embodiment of the first present invention, and is a schematic view of a state where the respective members are assembled with each other but press working is not yet performed.
Figure 2A:
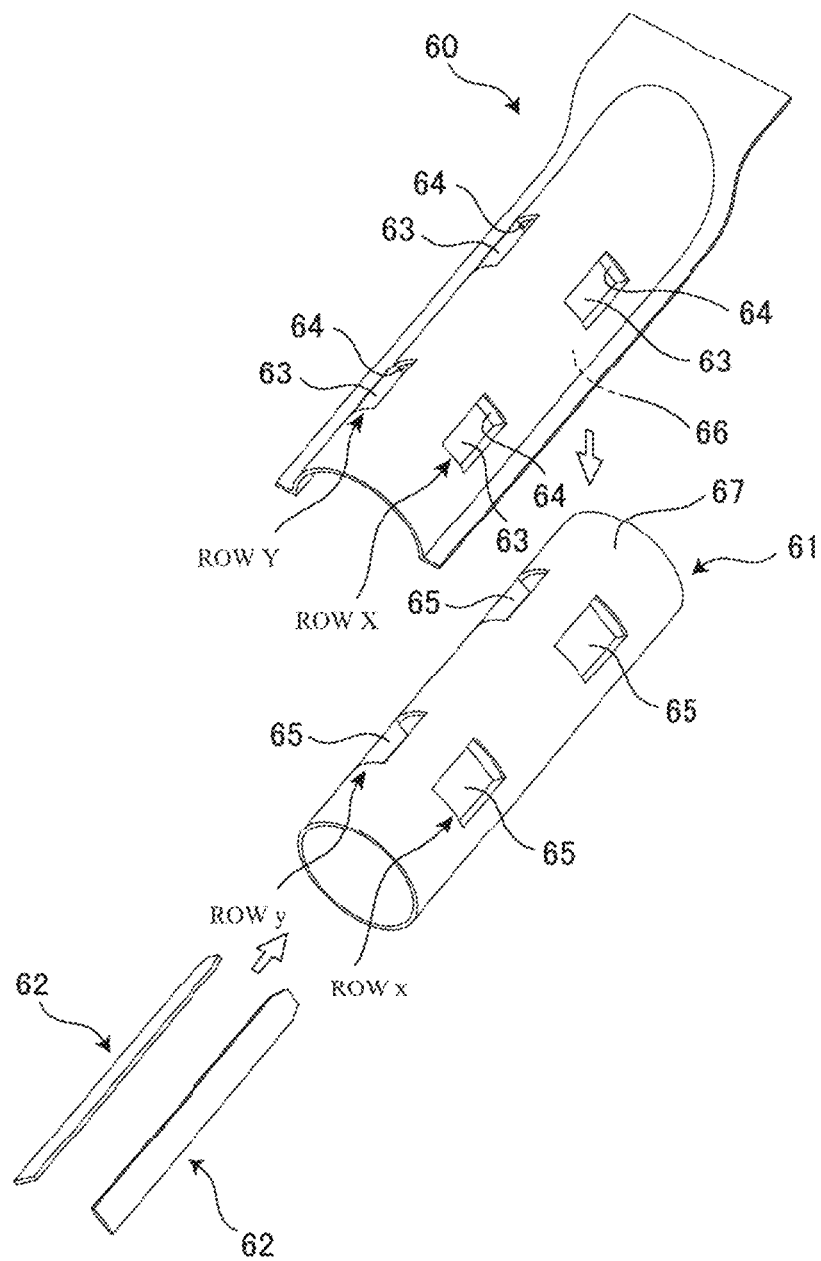
FIG. 2A is an explanatory view of members used in a method of manufacturing a joined member according to a second embodiment of a first present invention, and is a schematic view of the respective members.
Figure 2B:
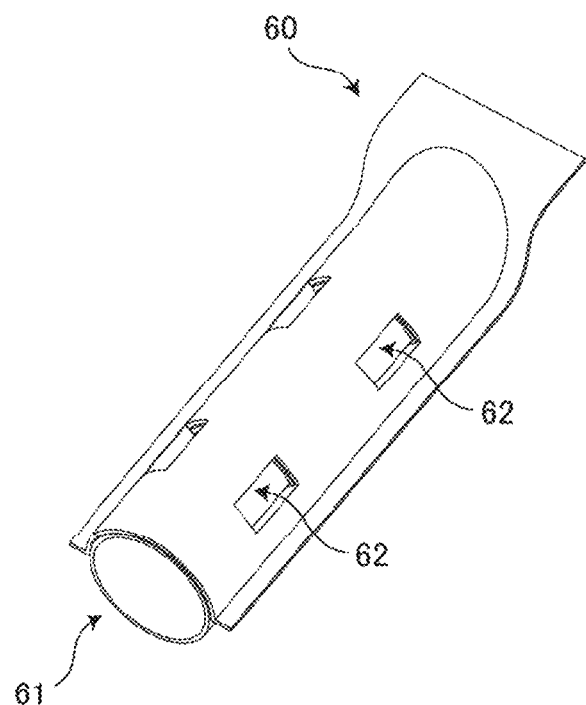
FIG. 2B is an explanatory view of the members used in the method of manufacturing a joined member according to the second embodiment of the first present invention, and is a schematic view of a state where the respective members are assembled with each other but press working is not yet performed.
Figure 2C:
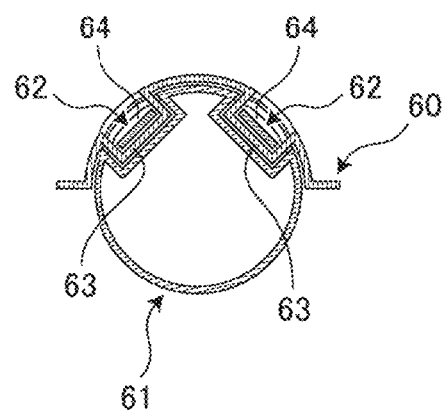
FIG. 2C is an explanatory view of the members used in the method of manufacturing a joined member according to the second embodiment of the first present invention, and is a cross-sectional view of a state where the respective members are assembled with each other but press working is not yet performed.
Figure 3A:
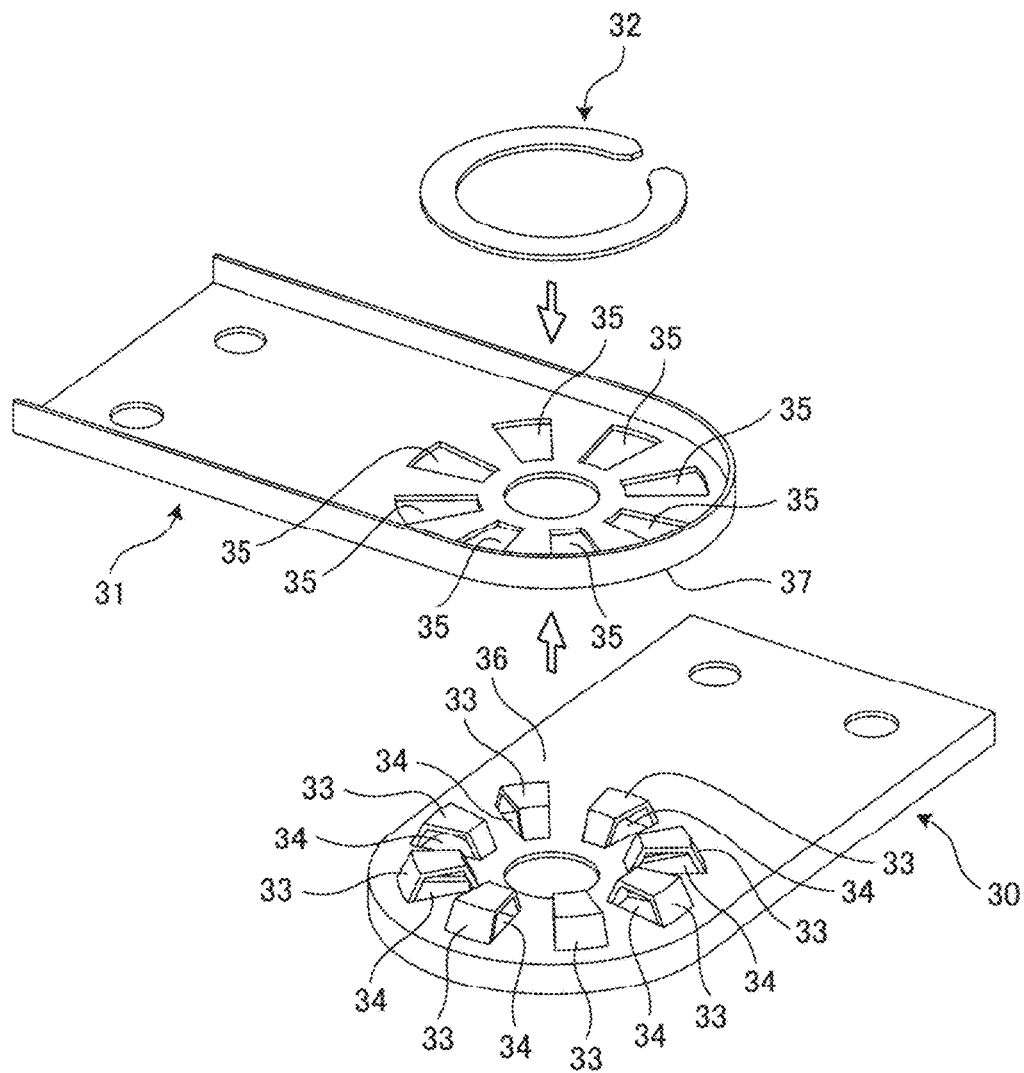
FIG. 3A is an explanatory view of members used in a method of manufacturing a joined member according to a third embodiment of a first present invention, and is a schematic view of the respective members.
Figure 3B:
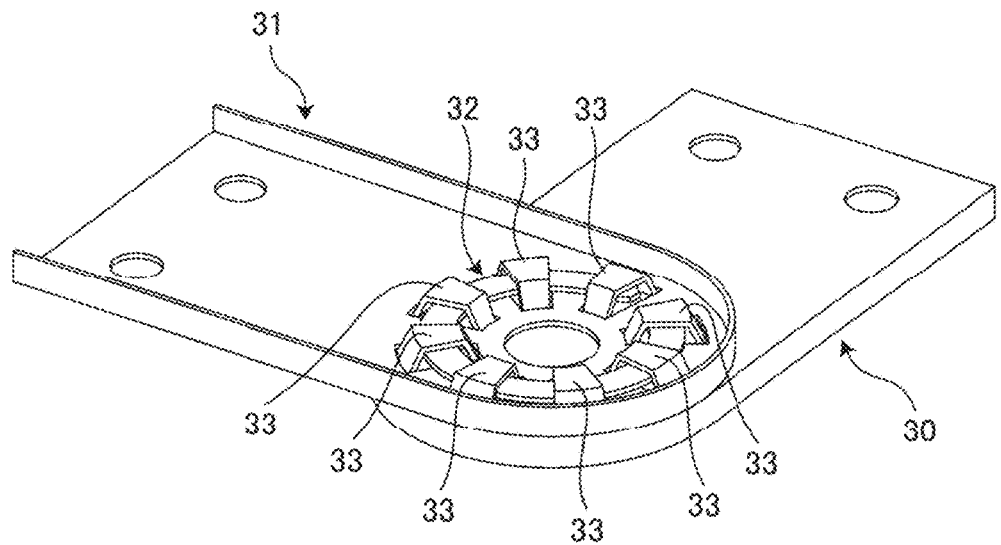
FIG. 3B is an explanatory view of the members used in the method of manufacturing a joined member according to the third embodiment of the first present invention, and is a schematic view of a state where the respective members are assembled with each other but press working is not yet performed.

Here, FIG. 1A is an explanatory view of members used in a method of manufacturing a joined member according to a first embodiment of a first present invention, and is a schematic view of the respective members. FIG. 1B is an explanatory view of the members used in the method of manufacturing a joined member according to the first embodiment of the first present invention, and is a schematic view of a state where the respective members are assembled with each other but press working is not yet performed. FIG. 2A is an explanatory view of members used in a method of manufacturing a joined member according to a second embodiment of a first present invention, and is a schematic view of the respective members. FIG. 2B is an explanatory view of the members used in the method of manufacturing a joined member according to the second embodiment of the first present invention, and is a schematic view of a state where the respective members are assembled with each other but press working is not yet performed. FIG. 2C is an explanatory view of the members used in the method of manufacturing a joined member according to the second embodiment of the first present invention, and is a cross-sectional view of a state where the respective members are assembled with each other but press working is not yet performed. FIG. 3A is an explanatory view of members used in a method of manufacturing a joined member according to a third embodiment of a first present invention, and is a schematic view of the respective members. FIG. 3B is an explanatory view of the members used in the method of manufacturing a joined member according to the third embodiment of the first present invention, and is a schematic view of a state where the respective members are assembled with each other but press working is not yet performed.

As shown in FIG. 1A and FIG. 1B, in a method of manufacturing a joined member according to the first embodiment of the first present invention, the joined member is manufactured using a first work member 10, a second work member 11, and a connecting member 12.

First, the members that are used in the manufacturing method according to the first embodiment of the first present invention are described.

The first work member 10 is a member made of ordinary strength steel and having a flat plate shape as a whole including a joining portion. The first work member 10 includes four first bridge portions 13 arranged in a straight line shape. The first bridge portions 13 are portions protruding in an arch shape, and an insertion hole 14 that is a through hole is formed in each first bridge portion 13.

The second work member 11 is a plate shaped member made of ordinary strength steel having a flat plate shape as a whole including a joining portion. The second work member 11 has four second openings 15 arranged in a straight line shape corresponding to the first bridge portions 13 of the first work member 10. Such second openings 15 are, in the same manner as the first bridge members 16, formed by protruding portions of the second work member 11 in an arch shape. In a state where the first work member 10 and the second work member 11 engage with each other, the first bridge portions 13 are accommodated in such portions protruding in an arch shape.

The connecting member 12 is a rod made of ordinary strength steel having a flat plate shape. The connecting member 12 has a length that allows the connecting member 12 to pass through four insertion holes 14 formed in the first bridge portion 13.

Next, a method of manufacturing a member according to the first embodiment of the first present invention using the first work member 10, the second work member 11 and the connecting member 12 described above is specifically described. As shown in FIG. 1A and FIG. 1B, first, a first joining surface 16 that the first bridge portions 13 of the first work member 10 are formed and a second joining surface 17 that the second openings 15 of the second work member 11 are exposed are made to face each other, and the first bridge portions 13 of the first work member 10 are made to engage with the second openings 15 of the second work member 11 by being inserted into the second openings 15 (engaging step). Next, the first work member 10 and the second work member 11 are temporarily fixed to each other by inserting the connecting member 12 into the insertion holes 14 formed in the first bridge portions 13 appearing on a side opposite to the second joining surface 17 of the second work member 11 (inserting step). Next, in a state where the first work member 10 and the second work member 11 are temporarily fixed to each other, the first bridge portions 13 of the first work member 10, the second openings 15 of the second work member 11 and the connecting member 12 are integrally formed with each other by pressing (press working step).

The joined member according to the first embodiment of the first present invention is manufactured in accordance with the steps described above.

Next, a method of manufacturing according to the second embodiment of the first present invention is described.

As shown in FIG. 2A to FIG. 2C, in a method of manufacturing according to the second embodiment of the first present invention, the joined member is manufactured using a first work member 60, a second work member 61, and a connecting member 62.

First, members used in a manufacturing method according to the second embodiment of the first present invention are described.

The first work member 60 is a plate shaped member made of ordinary strength steel. In the first work member 60, a joining portion is formed into a curved plate shape, and other portions are formed into a flat plate shape. The first work member 60 has two rows (row X, row Y) where two first bridge portions 63 are arranged in a straight line shape in each row. The first bridge portions 63 are portions protruding in an arch shape, and an insertion hole 64 that is a through hole is formed in each first bridge portion 63.

The second work member 61 is a tubular member made of ordinary strength steel. The second work member 61 is formed in a curved plate shape as a whole including a joining portion. The second work member 61 has two rows (row x, row y) where two second openings 65 are arranged in a straight line shape in each row corresponding to the first bridge portions 63 of the first work member 60. Such second openings 65 are formed, in the same manner as the first bridge portions 63, by protruding portions of the second work member 61 in an arch shape. In a state where the first work member 60 and the second work member 61 engage with each other, the first bridge portions 63 are accommodated in such portions protruding in an arch shape.

The connecting member 62 is a rod made of ordinary strength steel having a flat plate shape. The connecting member 62 has a length that allows the connecting member 62 to pass through two insertion holes 64 formed in the first bridge portions 63. In this embodiment, two connecting members 62 are used.

Next, the method of manufacturing a member according to the second embodiment of the first present invention using the first work member 60, the second work member 61, and the connecting members 62 described above is specifically described.

As shown in FIG. 2A to FIG. 2C, first, a first joining surface 66 that the first bridge portions 63 of the first work member 60 are formed and a second joining surface 67 of the second work member 61 are made to face each other. The first bridge portions 63 of the first work member 60 engage with the second openings 65 of the second work member 61 by being inserted into the second openings 65 (engaging step). In this case, the straight-line shape rows (row X, row Y) of the first work member 60 and the corresponding straight-line shape rows (row x, row y) of the second work member 61 respectively are made to engage with each other. Next, the first work member 60 and the second work member 61 are temporarily fixed to each other by inserting the connecting member 62 into the insertion holes 64 formed in the first bridge portions 63 appearing on a side opposite to the second joining surface 67 of the second work member 61 (inserting step). Next, in a state where the first work member 60 and the second work member 61 are temporarily fixed to each other, the first bridge portions 63 of the first work member 60, the second openings 65 of the second work member 61 and the connecting member 62 are integrally formed with each other by pressing (press working step).

The joined member according to the second embodiment of the first present invention is manufactured in accordance with the steps described above.

Next, a method of manufacturing according to the third embodiment of the first present invention is described.

As shown in FIG. 3A and FIG. 3B, in a method of manufacturing according to the third embodiment of the first present invention, the joined member is manufactured using a first work member 30, a second work member 31, and a connecting member 32.

First, the members used in the manufacturing method according to the third embodiment of the first present invention are described.

The first work member 30 is a member made of ordinary strength steel. The first work member 30 has a flat plate shape as a whole. The first work member 30 has an outer peripheral frame and includes a joining portion. The first work member 30 has eight first bridge portions 33 arranged in an annular shape. The first bridge portions 33 are portions protruding in an arch shape, and an insertion hole 34 that is a through hole is formed in each first bridge portion 33.

The second work member 31 is a plate-shaped member made of ordinary strength steel. The second work member 31 has a flat plate shape as a whole. The second work member 31 has an outer peripheral frame and includes a joining portion. The second work member 31 has eight second openings 35 arranged in an annular shape corresponding to the first bridge portions 33 of the first work member 30. Such second openings 35 are openings (holes) formed by cutting out portions of the second work member 31.

The connecting member 32 is a rod made of ordinary strength steel having an annular flat plate shape. The connecting member 32 has a length that allows the connecting member 32 to pass through eight insertion holes 34 formed in the first bridge portions 33.

Next, the method of manufacturing according to the third embodiment of the first present invention using the first work member 30, the second work member 31, and the connecting members 32 described above is described.

As shown in FIG. 3A and FIG. 3B, first, a first joining surface 36 that the first bridge portions 33 of the first work member 30 are formed and a second joining surface 37 of the second work member 31 are made to face each other. The first bridge portions 33 of the first work member 30 engage with the second openings 35 of the second work member 31 by being inserted into the second openings 35 (engaging step). Next, the first work member 30 and the second work member 31 are temporarily fixed to each other by inserting the connecting member 32 into the insertion holes 34 formed in the first bridge portions 30 appearing on a side opposite to the second joining surface 37 of the second work member (inserting step). Next, in a state where the first work member 30 and the second work member 31 are temporarily fixed to each other, the first bridge portions 33 of the first work member 30, the second openings 35 of the second work member 31 and the connecting member 32 are integrally formed with each other by pressing (press working step).

The joined member according to the third embodiment of the first present invention is manufactured in accordance with the steps described above.

Next, a method of manufacturing according to the embodiment of the second present invention is described.

Figure 4A:
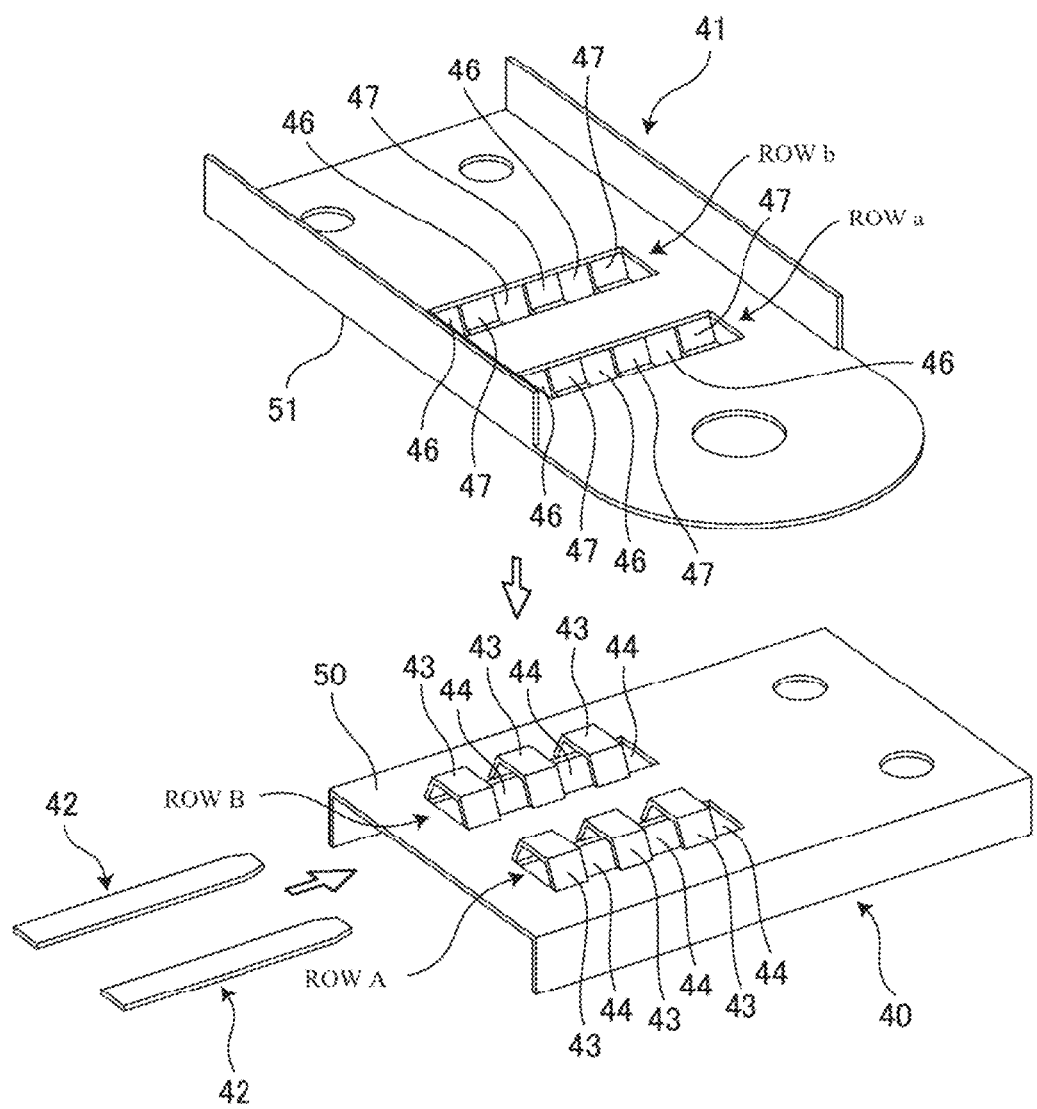
FIG. 4A is an explanatory view of members used in a method of manufacturing a joined member according to a first embodiment of a second present invention, and is a schematic view of the respective members.
Figure 4B:
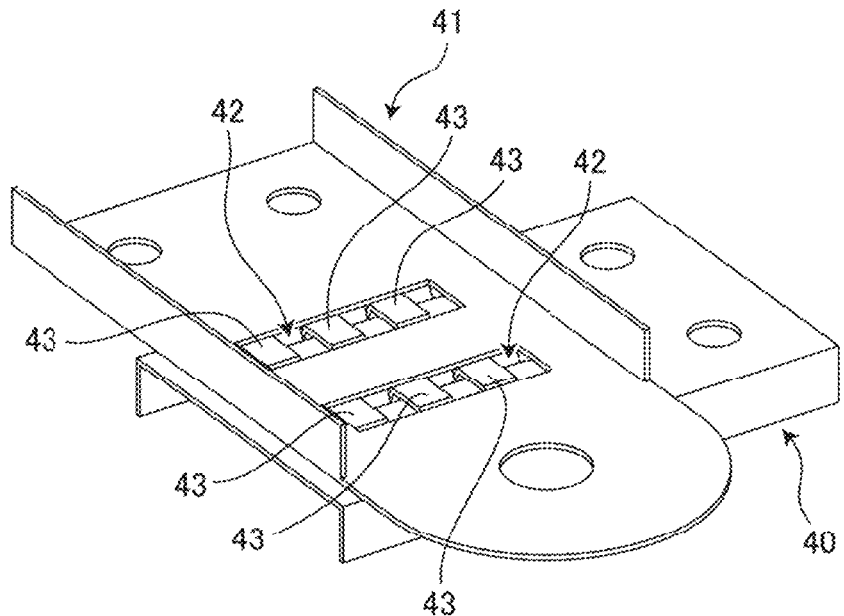
FIG. 4B is an explanatory view of the members used in the method of manufacturing a joined member according to the first embodiment of the second present invention, and is a schematic view of a state where the respective members are assembled with each other but press working is not yet performed.
Figure 4C:
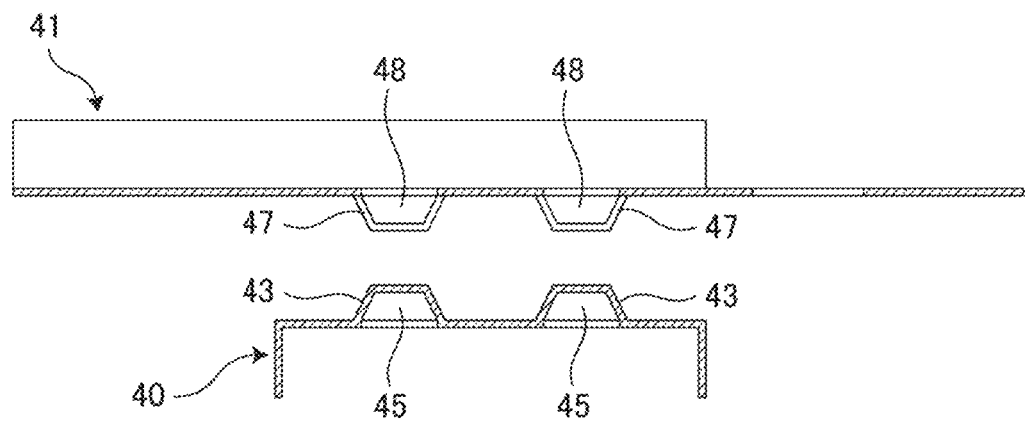
FIG. 4C is an explanatory view of members used in the method of manufacturing a joined member according to the first embodiment of the second present invention, and is a cross-sectional view of a state before the respective members are assembled.
Figure 4D:
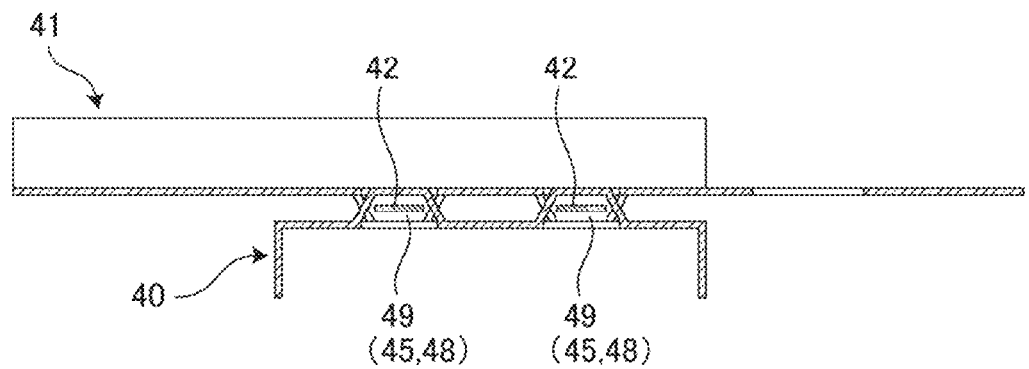
FIG. 4D is an explanatory view of the members used in the method of manufacturing a joined member according to the first embodiment of the second present invention, and is a cross-sectional view of a state where the respective members are assembled with each other but press working is not yet performed.
Figure 5A:
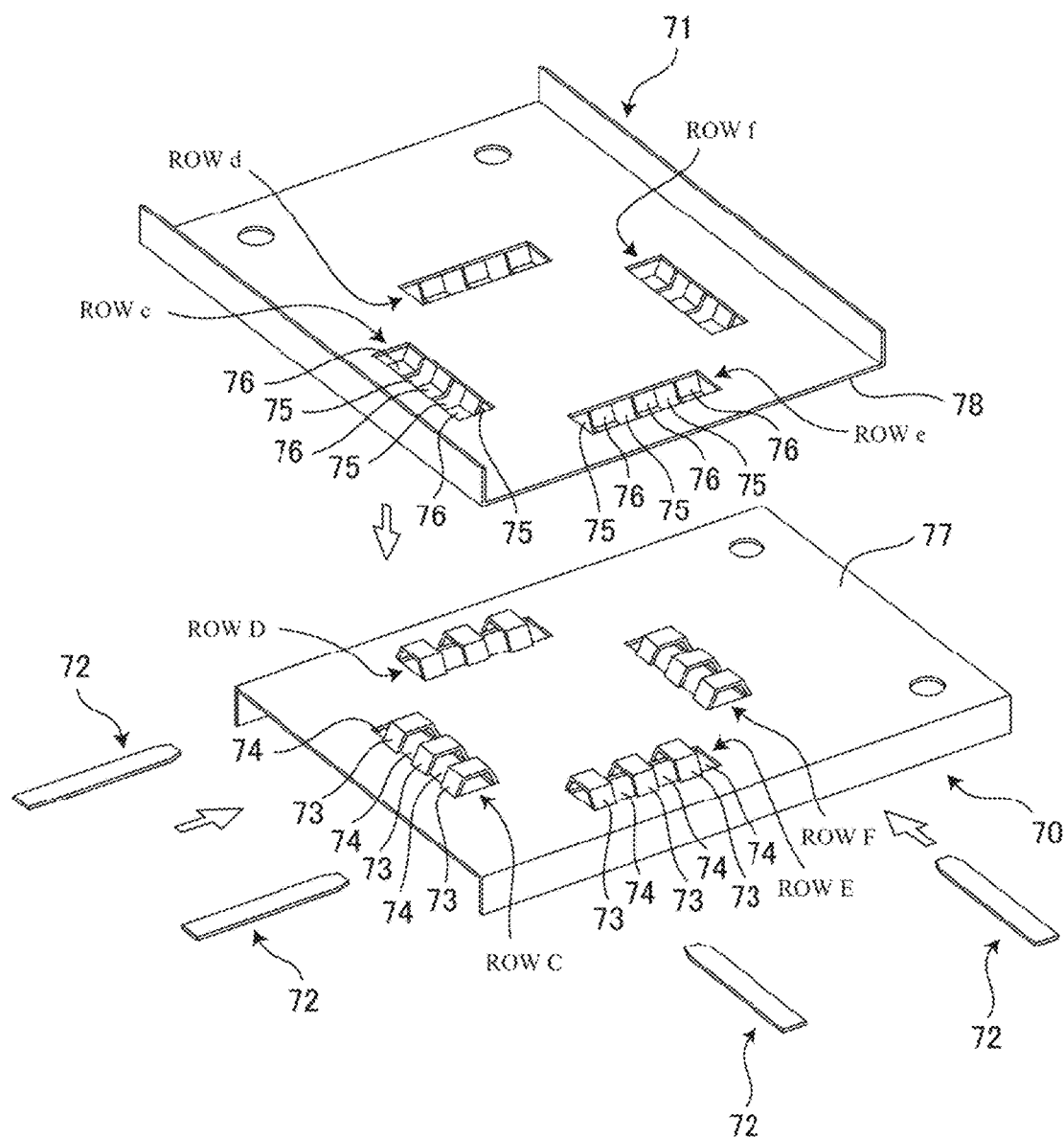
FIG. 5A is an explanatory view of members used in a method of manufacturing a joined member according to a second embodiment of a second present invention, and is a schematic view of the respective members.
Figure 5B:
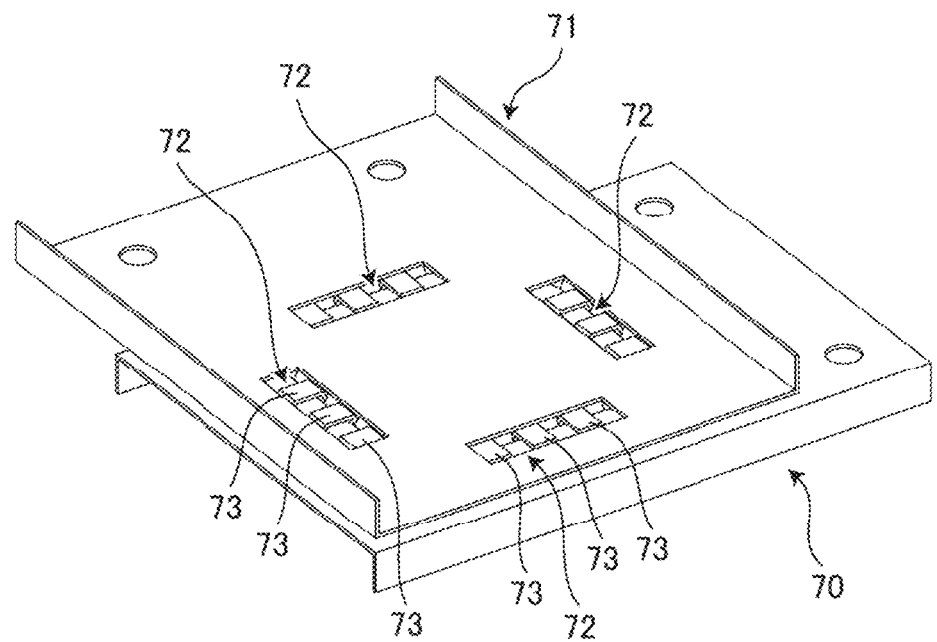
FIG. 5B is an explanatory view of the members used in the method of manufacturing a joined member according to the second embodiment of the second present invention, and is a schematic view of a state where the respective members are assembled with each other but press working is not yet performed.
Figure 6A:
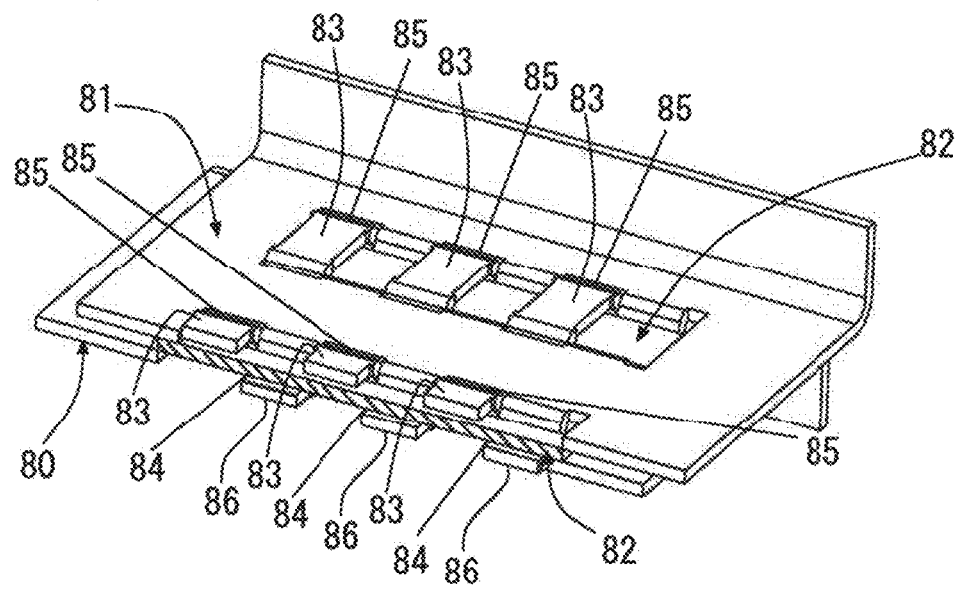
FIG. 6A is an explanatory view of members used in a method of manufacturing a joined member according to a third embodiment of the second present invention, and is a schematic view of a state where a joining surface of the joined member is shown in cross section, in which, respective members are assembled to each other but press working is not yet performed.

Here, FIG. 4A is an explanatory view of members used in a method of manufacturing a joined member according to a first embodiment of a second present invention, and is a schematic view of the respective members. FIG. 4B is an explanatory view of the members used in the method of manufacturing a joined member according to the first embodiment of the second present invention, and is a schematic view of a state where the respective members are assembled with each other but press working is not yet performed. FIG. 4C is an explanatory view of members used in the method of manufacturing a joined member according to the first embodiment of the second present invention, and is a cross-sectional view of a state before the respective members are assembled. FIG. 4D is an explanatory view of the members used in the method of manufacturing a joined member according to the first embodiment of the second present invention, and is a cross-sectional view of a state where the respective members are assembled with each other but press working is not yet performed. FIG. 5A is an explanatory view of members used in a method of manufacturing a joined member according to a second embodiment of a second present invention, and is a schematic view of the respective members. FIG. 5B is an explanatory view of the members used in the method of manufacturing a joined member according to the second embodiment of the second present invention, and is a schematic view of a state where the respective members are assembled with each other but press working is not yet performed. FIG. 6A is an explanatory view of members used in a method of manufacturing a joined member according to a third embodiment of the second present invention, and is a schematic view of a state where a joining surface of the joined member is shown in cross section, in which, respective members are assembled to each other but press working is not yet performed. FIG. 6B is an explanatory view of members used in the method of manufacturing a joined member according to the third embodiment of the second present invention, and is a schematic view of a state where a joining surface of the joined member after press working is shown in cross section.

As shown in FIG. 4A to FIG. 4D, in a method of manufacturing according to the first embodiment of the second present invention, the joined member is manufactured using a first work member 40, a second work member 41, and a connecting member 42.

First, members used in the manufacturing method according to the first embodiment of the second present invention is described.

The first work member 40 is a member made of ordinary strength steel. The first work member 40 has a flat plate like shape as a whole. The first work member 40 has a side frame on both sides, and includes a joining portion. The first work member 40 has two rows (row A, row B) where three first bridge portions 43 and three first openings 44 are arranged alternatively in a straight line shape in each row. The first bridge portions 43 are portions protruding in an arch shape, and an insertion hole 45 that is a through hole is formed in each first bridge portion 43. The first openings 44 are openings (holes) formed by cutting out portions of the first work member 40.

The second work member 41 is a member made of ordinary strength steel. The second work member 41 has a flat plate shape as hole. The second work member 41 has a side frame on both sides of a joining portion. The second work member 41 has two rows (row a, row b) where three second openings 46 and three second bridges 47 are arranged alternatively in a straight line shape in each row corresponding to the first bridge portions 43 and the first openings 44 of the first work member 40. The second openings 46 are openings (holes) formed by cutting out portions of the second work member 41. The second bridge portions 47 are portions protruding in an arch shape, and an insertion hole 48 that is a through hole is formed in each second bridge portion 47.

The connecting member 42 is a rod made of ordinary strength steel. The connecting member 42 has a flat plate shape. The connecting member 42 has a length that allows the connecting member 42 to pass through a communication passage 49 formed by three continuous insertion holes 45 formed in the first bridge portions 43 and three continuous insertion holes 48 formed in the second bridge portions 47. In this embodiment, two connecting members 42 are used.

Next, the manufacturing method according to the first embodiment of the second present invention using the first work member 40, the second work member 41 and the connecting members 42 described above is described.

As shown in FIG. 4A to FIG. 4D, first, a first joining surface 50 of the first work member 40 that the first bridge portions 43 are formed and a second joining surface 51 of the second work member 41 that the second bridge portions 47 are formed are made to face each other. The first work member 40 and the second work member 41 are made to engage with each other by bringing the bridge portions 43 of the first work member 40 and the second bridge portions 47 of the second work member 41 close to each other (engaging step). In this step, the rows (row A, row B) of the first work member 40 in a straight line shape and the corresponding rows (row a, row b) of the second work member 41 in a straight line shape are made to engage with each other respectively. Next, in a state where the first bridge portions 43 of the first work member 40 and the second bridge portions 47 of the second work member 41 are disposed close to each other and are made to engage with each other, the connecting members 42 are made to pass through the communication passages 49 each formed of the continuous insertions holes 45, 48 formed in the first bridge portions 43 and the second bridge portions 47 so as to temporarily fix the first work member 40 and the second work member 41 to each other (inserting step). Next, in a state where the first work member 40 and the second work member 41 are temporarily fixed to each other, the first bridge portions 43 and the first openings 44 of the first work member 40, the second openings 46 and the second bridge portions 47 of the second work member 41, and the connecting members 42 are integrally formed with each other by pressing (press working step).

The joined member according to the first embodiment of the second present invention is manufactured in accordance with the steps described above.

Next, a method of manufacturing according to the second embodiment of the second present invention is described.

As shown in FIG. 5A and FIG. 5B, in a method of manufacturing according to the second embodiment of the second present invention, the joined member is manufactured using a first work member 70, a second work member 71, and a connecting member 72.

First, the members used in the manufacturing method according to the second embodiment of the second present invention are described.

The first work member 70 is made of ordinary strength steel. The first work member 70 has a flat plate shape as a whole. The first work member 70 has both a side frame on both sides and includes a joining portion. The first work member 70 has four rows (row C to row F) where three first bridge portions 73 and three first openings 74 are alternatively arranged in a straight line shape in each row. The respective rows are arranged such that, on both sides of two rows arranged parallel to each other at the center, two rows are respectively arranged in the direction perpendicular to the direction that two rows are arranged at the center. The first bridge portions 73 are portions protruding in an arch shape, and an insertion hole that is a through hole is formed in each first bridge portion 73. The first openings 74 are openings (holes) formed by cutting out portions of the first work member 70.

The second work member 71 is a member made of ordinary strength steel. The second work member 71 has a flat plate shape as hole. The second work member 71 has a side frame both sides and includes a joining portion. The second work member 71 has four rows (row c to row f) where three second openings 75 and three second bridges 76 are alternatively arranged in a straight line shape in a row corresponding to the first bridge portions 73 and the first openings 74 of the first work member 70. The respective rows are arranged substantially in the same manner as the rows on the first work member 70. The second openings 75 are openings (holes) formed by cutting out portions of the second work member 71. The second bridge portions 76 are portions protruding in an arch shape, and an insertion hole that is a through hole is formed in each second bridge portion 76.

The connecting member 72 is a rod made of ordinary strength steel. The connecting member 72 has a flat plate shape. The connecting member 72 has a length that allows the connecting member 72 to pass through a communication passage formed by three continuous insertion holes formed in the first bridge portions 73 and three continuous insertion holes formed in the second bridge portions 76. In this embodiment, four connecting members 72 are used.

Next, the manufacturing method according to the second embodiment of the second present invention using the first work member 70, the second work member 71 and the connecting members 72 described above is described.

As shown in FIG. 5A and FIG. 5B, first, a first joining surface 77 of the first work member 70 that the first bridge portions 73 are formed and a second joining surface 78 of the second work member 71 that the second bridge portions 76 are formed are made to face each other. The first work member 70 and the second work member 76 are made to engage with each other by bringing the bridge portions 73 of the first work member 70 and the second bridge portions 76 of the second work member 71 close to each other (engaging step). In this step, the rows (row C to row F) of the first work member 70 in a straight line shape and the corresponding rows (row c to row f) of the second work member 71 in a straight line shape are made to engage with each other respectively. Next, in a state where the first bridge portions 73 of the first work member 70 and the second bridge portions 76 of the second work member 71 are disposed close to each other and are made to engage with each other, the connecting members 72 are made to pass through the communication passages each formed of the continuous insertions holes formed in the first bridge portions 73 and the second bridge portions 76 so as to temporarily fix the first work member 70 and the second work member 71 to each other (inserting step). Next, in a state where the first work member 70 and the second work member 71 are temporarily fixed to each other, the first bridge portions 73 and the first openings 74 of the first work member 70, the second openings 75 and the second bridge portions 76 of the second work member 71, and the connecting members 72 are integrally formed with each other by pressing (press working step).

The joined member according to the second embodiment of the second present invention is manufactured in accordance with the steps described above.

In this embodiment, a joining strength of the joined member can be enhanced by arranging the plurality of rows while changing the directions of the plurality of rows.

Next, a state of joining surfaces before and after press working of the joined member according to the third embodiment of the second present invention is described in detail. The drawings (FIG. 1A to FIG. 5B) that are referenced in the above-mentioned embodiments and the like are schematically described for enhancing the understanding of the present invention. However, in drawings (FIG. 6A and FIG. 6B) that are referenced in this embodiment and the like, the joined member depicted closer to actual ratios of sizes of an object is described. Further, in the drawings, a hatched portion indicates a cross section of a connecting member.

As shown in FIG. 6A and FIG. 6B, in the joined member according to the third embodiment of the second present invention, the joined member is manufactured using a first work member 80, a second work member 81 and a connecting member 82. In the third embodiment, an engaging step and an inserting step are substantially equal to the corresponding steps of the first and second embodiments of the above-mentioned second present invention and hence, the description of the engaging step and the inserting step is omitted.

By inserting the connecting member 82 into respective communication passages without forming a gap between the connecting members 82 and the communication passages, the first work member 80 and the second work member 81 are temporarily fixed to each other. In a state where the first work member 80 and the second work member 81 are temporarily fixed to each other, first bridge portions 83 and first openings 84 of the first work member 80, second openings 85 and second bridge portions 86 of the second work member 81, and the connecting members 82 are integrally formed with each other by pressing (press working step).

As shown in FIG. 6A, on joining surfaces of the joined member before press working, the inserted connecting members 82 are arranged in a straight line shape. On the other hand, as shown in FIG. 6B, on the joining surfaces of the joined member after press working, the connecting members 82 that are plastically deformed by a press are crimped in a jig zag shape and hence, the work members are firmly brought into close contact state with each other.

EXAMPLE

Using a method of manufacturing a joined member according to the present invention, a joined member is manufactured from two work members.

The work members include: a flat plate member (first work member) made of an ordinary strength steel and having a flat plate shape of a length of 100 mm, a width of 80 mm and a thickness of 3 mm; a flat plate member (second work member) made of ordinary steel member and having a flat plate shape of a length of 100 mm, a width of 80 mm and a thickness of 3 mm; and two rods (connecting members) having a flat plate shape of a length of 40 mm, a width of 80 mm and a thickness of 3 mm In the above-mentioned work members, the first work member has two rows where three bridges and three openings are alternately arranged in a straight line shape in each row. The second work member has two rows where three bridges and three openings are alternately arranged in a straight line shape corresponding to the bridges and openings of the first work member in each row.

The manufacturing method is performed in accordance with following steps.
(1) The joining surface of the first work member and a joining surface of the second work member are made to face each other, and the first work member and the second work member are made to engage with each other in a state where the bridges are disposed close to each other.
(2) The connecting member is made to pass through a communication passage formed by continuous insertion holes formed in the bridges of both work members in respective rows.
(3) The joining portions (the bridge portions, the opening portions, and the connecting members) are integrally formed to each other by pressing using a press machine.

Figure 7:
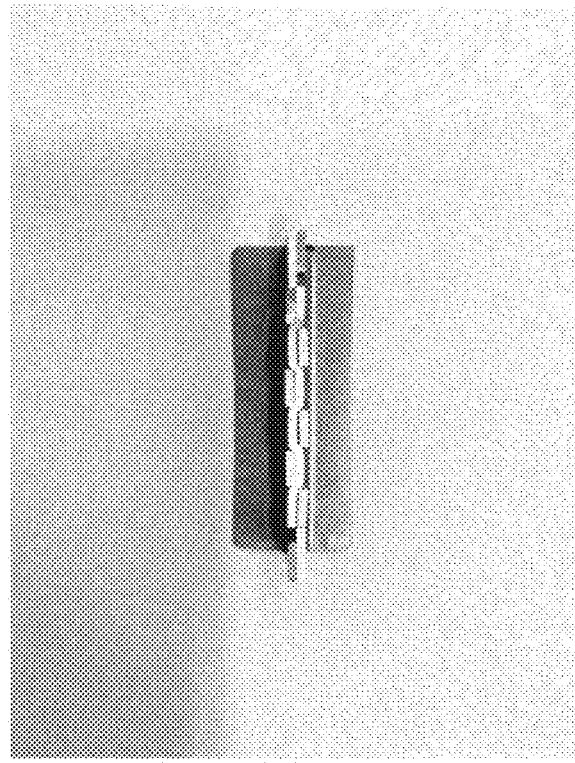
FIG. 7 shows photographs of a state where a joining surface of a joined member after press working manufactured according to the embodiment is shown in cross section.
Figure 7:
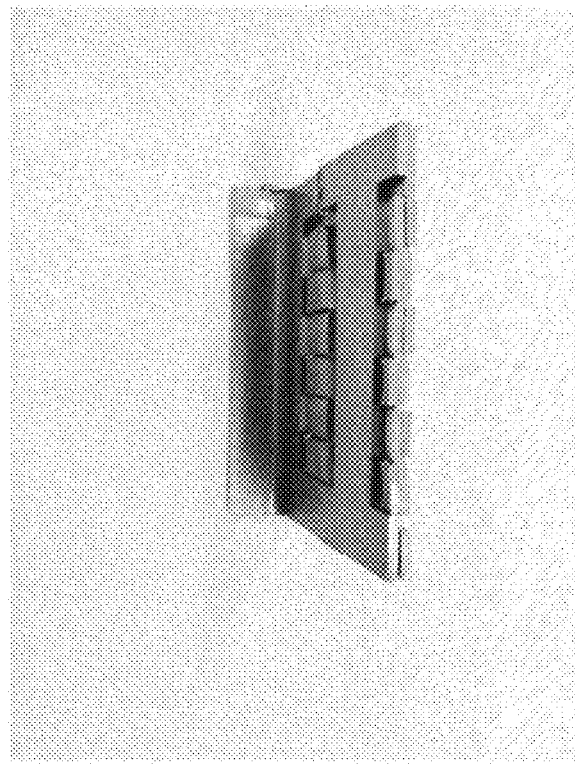

FIG. 7 shows photographs showing states where joining surfaces of the joined member after press working are cut. As shown in FIG. 7, it is confirmed that two work members are firmly joined to each other in the joined member formed after press working. According to the method of manufacturing a joined member according to the present invention, it is found that the members can be joined to each other in a stable manner with a high strength without using welding.

Industrial applicability

The joining method according to the present invention is applicable to joining of members made of metal or the like and hence, it is used usefully in industries.

REFERENCE SIGNS LIST 10 first work member
11 second work member
12 connecting member
13 first bridge portion
14 insertion hole
15 second opening
16 first joining surface
17 second joining surface
30 first work member
31 second work member
32 connecting member
33 first bridge portion
34 insertion hole
35 second opening
36 first joining surface
37 second joining surface
40 first work member
41 second work member
42 connecting member
43 first bridge portion
44 first opening
45 insertion hole
46 second opening
47 second bridge portion
48 insertion hole
49 communication passage
50 first joining surface
51 second joining surface
60 first work member
61 second work member
62 connecting member
63 first bridge portion
64 insertion hole
65 second opening
66 first joining surface
67 second joining surface
70 first work member
71 second work member
72 connecting member
73 first bridge portion
74 first opening
75 second opening
76 second bridge portion
77 first joining surface
78 second joining surface
80 first work member
81 second work member
82 connecting member
83 first bridge portion
84 first opening
85 second opening
86 second bridge portion

The invention claimed is:
1. A method of manufacturing a joined member where joining portions of at least two members are integrally formed with each other by press working thus joining said at least two members, the method comprising:
engaging a first work member having a first bridge portion protruding in a bridge shape and a second work mem- ber having a second opening corresponding to the first bridge portion of the first work member with each other by inserting the first bridge portion of the first work member into the second opening of the second work member;

inserting a connecting member into the insertion hole formed in the first bridge portion in a state where the first bridge portion of the first work member is inserted into and is made to engage with the second opening of the second work member; and pressing the first bridge portion of the first work member, the second opening of the second work member and the connecting member to be integrally formed with each other in a state where the connecting member is inserted into an insertion hole formed in the first bridge portion of the first work member.

2. The method of manufacturing a joined member according to claim 1, wherein the first work member has a plurality of first bridge portions arranged in a straight line shape, and the second work member has a plurality of the second openings arranged in a straight line shape corresponding to the first bridge portions of the first work member.

3. The method of manufacturing a joined member according to claim 1, wherein the first work member has a plurality of the first bridge portions arranged in an annular shape, and the second work member has a plurality of second openings arranged in an annular shape corresponding to the first bridge portions of the first work member.

4. The method of manufacturing a joined member according to claim 1, wherein the joining portion of the first work member is formed in a flat plate shape or a curved plate shape.

5. The method of manufacturing a joined member according to claim 1, wherein the joining portion of the second work member is formed in a flat plate shape or a curved plate shape.

6. A method of manufacturing a joined member where joining portions of at least two members are integrally formed with each other by press working thus joining said at least two members, the method comprising:

engaging a first work member having a first bridge portion protruding in a bridge shape and a first opening disposed close to the first bridge portion, and a second work member having a second opening corresponding to the first bridge portion of the first work member and a second bridge portion disposed close to the second opening and corresponding to the first opening of the first work member with each other by bringing the first bridge portion of the first work member and the second bridge portion of the second work member close to each other;

inserting a connecting member into a communication passage formed of continuous insertion holes formed in the first bridge portion and the second bridge portion in a state where the first bridge portion of the first work member and the second bridge portion of the second work member are made to engage with each other by being disposed close to each other; and pressing the first bridge portion and the first opening of the first work member, the second opening and the second bridge portion of the second work member, and the connecting member to be integrally formed with each other in a state where the connecting member is inserted into the communication passage.

7. The method of manufacturing a joined member according to claim 6, wherein the first work member has a plurality of the first bridge portions and a plurality of the first opening, the first bridge portions and the first openings are alternately arranged in a straight line shape, the second work member has a plurality of second openings and a plurality of second bridges, and the second openings and the second bridges are alternately arranged in a straight line shape corresponding to the first bridge portions and the first openings of the first work member.

8. The method of manufacturing a joined member according to claim 6, wherein the first work member has a plurality of the first bridge portions and a plurality of the first openings, the first bridge portions and the first openings are alternately arranged in an annular shape, the second work member has a plurality of second openings and a plurality of second bridges, the second openings and the second bridges are alternately arranged in an annular shape corresponding to the first bridge portions and the first openings of the first work member.

9. The method of manufacturing a joined member according to claim 6, wherein the joining portion of the first work member is formed in a flat plate shape or a curved plate shape.

10. The method of manufacturing a joined member according to claim 6, wherein the joining portion of the second work member is formed in a flat plate shape or a curved plate shape.

* * * * *